(12) United States Patent
Ryon et al.

(10) Patent No.: US 11,286,862 B1
(45) Date of Patent: Mar. 29, 2022

(54) TORCH INJECTOR SYSTEMS FOR GAS TURBINE COMBUSTORS

(71) Applicant: Delavan Inc., Des Moines, IA (US)

(72) Inventors: Jason Ryon, Carlisle, IA (US); Lev Alexander Prociw, Johnston, IA (US); Brandon P. Williams, Johnston, IA (US)

(73) Assignee: Delavan Inc., Des Moines, IA (US)

( * ) Notice: Subject to any disclaimer, the term of this patent is extended or adjusted under 35 U.S.C. 154(b) by 0 days.

(21) Appl. No.: 17/127,228

(22) Filed: Dec. 18, 2020

(51) Int. Cl.
*F02C 7/266* (2006.01)
*F23R 3/34* (2006.01)
*F23R 3/28* (2006.01)
*F02C 7/22* (2006.01)

(52) U.S. Cl.
CPC ............... *F02C 7/266* (2013.01); *F23R 3/34* (2013.01); *F02C 7/222* (2013.01); *F23R 3/286* (2013.01); *F23R 2900/00009* (2013.01)

(58) Field of Classification Search
CPC .. F02C 7/26; F02C 7/264; F02C 7/266; F23R 3/34; F23R 3/343; F23R 3/346; F23R 3/28; F23R 3/283; F23R 3/286; F23R 2900/00009; F23Q 9/00
See application file for complete search history.

(56) References Cited

U.S. PATENT DOCUMENTS

| | | |
|---|---|---|
| 2,540,642 A | 2/1951 | Allen et al. |
| 2,541,900 A | 2/1951 | Williams |
| 2,645,082 A | 7/1953 | Sarto |
| 2,648,951 A | 8/1953 | McDougal |
| 2,811,676 A | 10/1957 | Smits |
| 2,840,742 A | 6/1958 | Watters |
| 2,885,859 A | 5/1959 | Barberis |
| 2,958,196 A | 11/1960 | Wie et al. |
| 3,009,321 A | 11/1961 | Jones et al. |
| 3,487,636 A | 1/1970 | Scott et al. |
| 3,954,389 A | 5/1976 | Szetela |
| 3,990,834 A | 11/1976 | Dubell et al. |

(Continued)

FOREIGN PATENT DOCUMENTS

| | | |
|---|---|---|
| EP | 2677240 B1 | 4/2020 |
| GB | 819141 A | 8/1959 |
| GB | 859184 A | 1/1961 |

*Primary Examiner* — William H Rodriguez
(74) *Attorney, Agent, or Firm* — Kinney & Lange, P.A.

(57) ABSTRACT

A combustor system for a gas turbine engine includes a combustor case, a combustor liner disposed within the combustor case and defining a main combustion chamber, a dome defining an upstream end of the main combustion chamber, and at least one torch injector attached to the dome of the main combustion chamber configured to inject combustion gases into the main combustion chamber. Each torch injector includes a torch injector housing defining and surrounding a torch combustion chamber configured to house a combustion reaction, an outlet passage defined by the torch injector housing, an electrothermal ignition source extending at least partially into the torch combustion chamber, and a fuel injector configured to inject fuel into the torch combustion chamber to at least partially impinge on the electrothermal ignition source and generate the combustion gases. The outlet passage directly fluidly connects the torch combustion chamber to the main combustion chamber.

19 Claims, 4 Drawing Sheets

(56) References Cited

U.S. PATENT DOCUMENTS

| | | | |
|---|---|---|---|
| 4,012,904 | A | 3/1977 | Nogle |
| 4,099,373 | A | 7/1978 | Griffin et al. |
| 4,112,675 | A | 9/1978 | Pillsbury et al. |
| 4,194,358 | A | 3/1980 | Stenger |
| 4,412,414 | A | 11/1983 | Novick et al. |
| 4,860,533 | A | 8/1989 | Joshi |
| 4,912,931 | A | 4/1990 | Joshi et al. |
| 5,085,040 | A | 2/1992 | Tilston |
| 5,390,855 | A | 2/1995 | Mims et al. |
| 5,469,700 | A * | 11/1995 | Corbett ............... F02C 9/28 60/39.281 |
| 5,499,497 | A | 3/1996 | DeFreitas |
| 5,636,511 | A | 6/1997 | Pfefferle et al. |
| 5,673,554 | A * | 10/1997 | DeFreitas ............ F02C 7/264 102/200 |
| 5,695,328 | A | 12/1997 | DeFreitas et al. |
| 5,845,480 | A | 12/1998 | DeFreitas et al. |
| 6,195,247 | B1 | 2/2001 | Cote et al. |
| 6,240,731 | B1 | 6/2001 | Hoke et al. |
| 6,247,300 | B1 | 6/2001 | Muramatsu et al. |
| 6,483,022 | B1 | 11/2002 | Packard |
| 6,884,967 | B1 | 4/2005 | Leigh |
| 6,952,927 | B2 | 10/2005 | Howell et al. |
| 6,968,699 | B2 | 11/2005 | Howell et al. |
| 7,124,724 | B2 | 10/2006 | Fleetwood |
| 7,137,255 | B2 | 11/2006 | Schmotolocha et al. |
| 7,216,488 | B2 | 5/2007 | Howell et al. |
| 7,470,875 | B1 | 12/2008 | Wilcox et al. |
| 7,481,248 | B2 | 1/2009 | Prociw et al. |
| 7,637,094 | B2 | 12/2009 | Costello et al. |
| 8,365,710 | B2 | 2/2013 | Lykowski et al. |
| 8,713,944 | B2 | 5/2014 | Bleeker |
| 9,080,772 | B2 | 7/2015 | Prociw et al. |
| 9,135,755 | B2 | 9/2015 | Youssef |
| 9,279,398 | B2 | 3/2016 | McAlister |
| 9,413,141 | B2 | 8/2016 | Leglaye et al. |
| 9,453,491 | B2 | 9/2016 | Tanaka et al. |
| 9,476,399 | B1 | 10/2016 | Munson |
| 9,567,912 | B2 | 2/2017 | Prociw et al. |
| 10,156,189 | B2 | 12/2018 | Sze et al. |
| 10,488,047 | B2 | 11/2019 | Ott et al. |
| 10,584,639 | B2 | 3/2020 | Dam et al. |
| 10,711,699 | B2 | 7/2020 | Dam et al. |
| 2002/0050061 | A1 | 5/2002 | Komyoji et al. |
| 2004/0168442 | A1 | 9/2004 | Schmotolocha et al. |
| 2005/0053876 | A1 | 3/2005 | Joos et al. |
| 2005/0166595 | A1 * | 8/2005 | Fletcher ............... F02C 9/28 60/703 |
| 2005/0284442 | A1 | 12/2005 | Stuttaford et al. |
| 2006/0054233 | A1 | 3/2006 | Prociw et al. |
| 2008/0141651 | A1 | 6/2008 | Eason et al. |
| 2010/0126617 | A1 | 5/2010 | Stroempl et al. |
| 2012/0085468 | A1 | 4/2012 | Walker |
| 2013/0000323 | A1 | 1/2013 | Kupratis |
| 2013/0040255 | A1 | 2/2013 | Shi et al. |
| 2013/0143171 | A1 * | 6/2013 | Soda ................. F23D 14/38 431/353 |
| 2014/0150401 | A1 | 6/2014 | Venter |
| 2014/0216384 | A1 | 8/2014 | Tanaka et al. |
| 2014/0366505 | A1 | 12/2014 | Prociw et al. |
| 2014/0366542 | A1 | 12/2014 | Teets |
| 2015/0275769 | A1 | 10/2015 | Foutch et al. |
| 2015/0308351 | A1 | 10/2015 | Sheridan |
| 2015/0345426 | A1 | 12/2015 | Houston et al. |
| 2015/0345788 | A1 * | 12/2015 | Miyata ............... F23Q 9/00 431/281 |
| 2016/0003150 | A1 | 1/2016 | Dicintio et al. |
| 2016/0010559 | A1 | 1/2016 | Hoke et al. |
| 2016/0047318 | A1 | 2/2016 | Dam et al. |
| 2016/0169110 | A1 | 6/2016 | Myers et al. |
| 2016/0230993 | A1 | 8/2016 | Dai et al. |
| 2017/0138266 | A1 | 5/2017 | Caples |
| 2017/0145852 | A1 | 5/2017 | McCune et al. |
| 2017/0284298 | A1 | 10/2017 | Suciu et al. |
| 2017/0350590 | A1 | 12/2017 | Choudhri et al. |
| 2018/0010795 | A1 | 1/2018 | Nath et al. |
| 2018/0134407 | A1 | 5/2018 | Elbibary et al. |
| 2018/0154446 | A1 | 6/2018 | Brown et al. |
| 2018/0170575 | A1 | 6/2018 | Ziarno |
| 2018/0172271 | A1 | 6/2018 | Moniz et al. |
| 2018/0179896 | A1 | 6/2018 | Pal et al. |
| 2018/0179956 | A1 | 6/2018 | Wertz |
| 2018/0283692 | A1 | 10/2018 | Ryon et al. |
| 2018/0356095 | A1 | 12/2018 | Patel et al. |
| 2019/0010872 | A1 | 1/2019 | Dam et al. |
| 2019/0032561 | A1 | 1/2019 | Stoia et al. |
| 2020/0191059 | A1 | 6/2020 | Ryon et al. |
| 2020/0309378 | A1 * | 10/2020 | Dam .................. F23R 3/14 |
| 2020/0348024 | A1 | 11/2020 | Hicks |
| 2021/0215100 | A1 | 7/2021 | Head et al. |

* cited by examiner

TORCH INJECTOR SYSTEMS FOR GAS TURBINE COMBUSTORS

BACKGROUND

The present disclosure relates to gas turbine engines and, more particularly, to torch injectors for use with combustors of gas turbine engines.

Combustors for gas turbine engines use various ignition sources to ignite fuel and create a flame within the combustor. The fuel is provided to an interior volume of the combustor by one or more fuel manifolds, fuel lines, and fuel injectors. The ignition source can be, for example, a spark igniter or a torch igniter. Spark igniters use electric current to ignite fuel, while torch igniters provide a flame as an ignition source.

SUMMARY

In one embodiment, a combustor system for a gas turbine engine includes a combustor case, a combustor liner disposed within the combustor case and defining a main combustion chamber, a dome defining an upstream end of the main combustion chamber, and at least one torch injector attached to the dome of the main combustion chamber configured to inject combustion gases into the main combustion chamber. Each torch injector includes a torch injector housing defining and surrounding a torch combustion chamber configured to house a combustion reaction, an outlet passage defined by the torch injector housing, an electrothermal ignition source extending at least partially into the torch combustion chamber, and a fuel injector configured to inject fuel into the torch combustion chamber to at least partially impinge on the electrothermal ignition source and generate the combustion gases. The outlet passage directly fluidly connects the torch combustion chamber to the main combustion chamber.

In another embodiment, a method of operating a combustor system in a gas turbine engine includes flowing a first fuel from a first fuel injector to a first torch combustion chamber of a first torch injector, igniting a first portion of the first fuel by impinging the first portion on a first electrothermal ignition source within a first torch combustion chamber to create first combustion gases, flowing the first combustion gases to a main combustion chamber through a first outlet passage, flowing a second, unignited portion of the first fuel from the first fuel injector to the main combustion chamber through the first torch combustion chamber and the first outlet passage, and igniting the second, unignited portion of the first fuel with the first combustion gases in the main combustion chamber. The torch injector includes the first torch injector housing, first outlet passage, and the first electrothermal ignition source. The first torch injector housing defines the first torch combustion chamber, the first outlet passage directly fluidly connects the first torch combustion chamber to the main combustion chamber of the combustor system, and the first electrothermal ignition source is disposed at least partially in the first torch combustion chamber.

The present summary is provided only by way of example, and not limitation. Other aspects of the present disclosure will be appreciated in view of the entirety of the present disclosure, including the entire text, claims, and accompanying figures.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present invention includes structures and methods for torch injectors for combustors used in gas turbine engines. These structures and methods advantageously allow for the integration of fuel injectors with ignition devices suitable for use with combustors, offering improved redundancy, control, and monitoring over conventional combustors.

Figure 1:
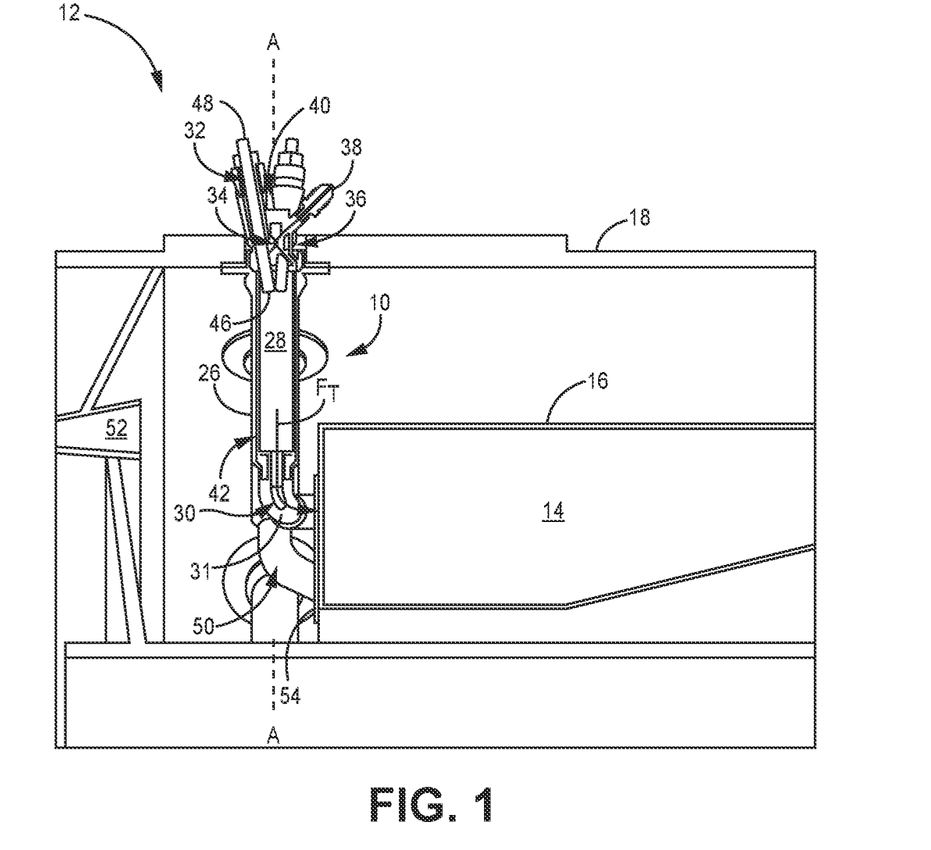
FIG. 1 is a cross-sectional view example of an internally-mounted torch igniter for a combustor of a gas turbine engine.

FIG. 1 is a cross-sectional view of torch igniter 10, which is located in combustion section 12 of a gas turbine engine. Combustion section 12 should be understood to be situated between compressor and turbine sections of the engine (at left and right, respectively; not shown), and the section plane of FIG. 1 can, for example, be oriented through a central rotational axis of the engine. Combustion section 12 includes main combustor 14, which is depicted as a forward flow combustor, though it should also be understood that combustor 14 can be a reverse flow combustor or can have any other suitable flow configuration. Torch igniter 10 is connected to main combustor 14 through combustor liner 16 and mounted partially internal to combustor case 18. Torch igniter 10 includes housing 26, which is generally annular and defines a radial extent of torch combustion chamber 28, which is configured to house a combustion reaction. Housing 26 extends along and is centered on axis A-A. Housing 26 is connected to outlet housing 30, which is generally annular and defines a radial extent of outlet passage 31. Outlet passage 31 is disposed at the downstream end of torch combustion chamber 28 and fluidly connects torch combustion chamber 28 of torch igniter 10 to the interior volume of main combustor 14. Torch igniter 10 also includes surface igniter 32, fuel injector 34, and cap section 36. Cap section 36 is disposed at the upstream end of torch combustion chamber 28 along axis A-A and forms the upstream extent of torch combustion chamber 28. Fuel inlet 38 is attached to cap section 36 and fluidly connects a fuel source to fuel injector 34. Air inlet 40 is formed in cap section 36 and is configured to intake a flow of compressed air from a compressed air source, such as an auxiliary air compressor. However, air inlet 40 can also be configured to intake a flow of compressed air from inside of combustor case 18. Air taken in at air inlet 40 flows through channels 42 and a portion can be used by fuel injector 34, as will be described subsequently. Channels 42 extend along the length of torch combustion chamber 28 through housing 26 and are configured to cool the inner surface of housing 26, which is exposed to hot combustion gases generated in torch combustion chamber 28.

In FIG. 1, surface igniter 32 is rod-shaped and includes internal end 46 and external end 48. Surface igniter 32 can be any type of igniter suitable for igniting fuel in torch combustion chamber 28, and in some examples can be spark igniters. In some examples, surface igniter 32 is an electro-thermal ignition source, such as a glow plug, capable of being resistively heated by an electrical power source. The electrical power source is connected to surface igniter 32 at external end 48. External end 48 can also be connected to a controller capable of measuring the electrical resistivity of surface igniter 32. The controller can also be connected to the power source and can be configured to selectively delivery power to external end 48.

As depicted in FIG. 1, internal end 46 of surface igniter 32 extends into torch combustion chamber 28, while external end 48 extends away from torch combustion chamber 28 and outside of combustor case 18. Locating external end 48 outside of combustor case 18 prevents the high-temperature air inside combustor case 18 from damaging the electrical connections between the power source and external end 48. Generally, surface igniter 32 is composed of a material capable of being non-destructively resistively heated. The material can be a ceramic material, such as silicon nitride. It should be understood, however, surface igniter 32 can be made of any suitable material.

In operation, fuel injector 34 injects a fuel that impinges on internal end 46 of hot surface igniter 32 to ignite the fuel and create combustion gases within combustion chamber 28. The fuel is supplied to fuel injector 34 by fuel inlet 38, which receives fuel from a fuel source. The fuel is generally a liquid fuel, but can also be a gaseous fuel in some examples. The liquid fuel can, for example, be conventional diesel, biodiesel, kerosene, naphtha, or a blend of any of those fuels. The liquid fuel can also be, for example, a jet fuel. A portion of air taken in at inlet 40 is be used to atomize liquid fuel before it is injected into torch combustion chamber 28. Fuel injector 34 can also be configured to inject a gaseous fuel. The gaseous fuel can, for example, be selected from natural gas, hydrogen, ammonia, liquid hydrogen, syngas, or a blend of any of those fuels.

The combustion gases exit torch combustion chamber 28 through outlet passage 31 and to an interior volume of main combustor 14 according to flow path $F_T$. As shown in FIG. 1, outlet passage 31 is disposed adjacent to main fuel injector 50, which flows fuel at relatively high flow rates for combustion within main combustor 14. Generally, outlet passage 31 is configured to flow hot combustion gases into a volume of main combustor 14 that is within the injection pattern of fuel injected by main fuel injector 50 so that combustion gases from torch igniter 10 ignite fuel from main fuel injector 50 and thereby initiate combustion within main combustor 14. High-pressure air for use with main combustor 14 is supplied to the interior of combustor case 18 through diffuser 52.

Air swirler 54 surrounds main fuel injector 50 where it connects to combustor liner 16. Air swirler 54 is generally annular and contains multiple apertures that fluidly connect the interior of combustor case 18 to main combustor 14. The apertures channel air from inside combustor case 18 into main combustor 14 and improve mixing between fuel and air within the main combustor.

Channels 42 are helically-shaped and extend through the length of housing 26. Air flowing through channels 42 is used to cool the inner surface of housing 26, which is exposed to the hot combustion gases generated in combustion chamber 28. The helical shape increases the total surface area of channels 42 available to cool housing 26. Adjacent portions of channels 42 are separated by fins that are thermally connected to the interior surface of housing 26, further increasing the total surface area available for cooling.

Combustion gases generated in torch combustion chamber 28 are generally at a relatively high pressure. Air inside combustor case 18 is also generally at a relatively high pressure, while air outside combustor case 18 is generally at a relatively low pressure. In configurations of torch igniter 10 where housing 26 and outlet housing 30 are mounted fully or partially externally to combustor case 18, they must be relatively thick to resist deforming due to the pressure difference between high-pressure gases in torch combustion chamber 28 and low-pressure air outside of combustor case 18. Conversely, in examples where housing 26 and outlet housing 30 are mounted internally to combustor case 18, such as the example shown in FIG. 1, they do not need to be relatively thick to resist pressure-induced deformation, as combustion gases in torch combustion chamber 28 and air inside combustor case 18 are both at a relatively high pressure. Consequently, these examples allow for housing 26 and outlet housing 30 to be relatively thin, reducing the overall weight of torch igniter 10.

In the depicted example, housing 26 and cap 36 are centered on and extend along axis A-A. Outlet housing 30 and outlet passage 31 extend along axis A-A adjacent to housing 26 torch combustion chamber 28 and turn to extend transversely transverse to axis A-A where outlet housing 30 is connected to the dome of main combustor 14. This orientation allows for housing 26 and outlet housing 30 to disposed inside of combustor case 18. However, it should be understood that housing 26, cap 36, and outlet housing 30 can have other suitable orientations, including orientations where housing 26 and outlet housing 30 are disposed outside of combustor case 18.

Advantageously, torch igniter 10 can operate continuously during the entire operational time of the gas turbine engine in which it is located. Continuous operation allows torch igniter 10 to easily facilitate altitude re-lights of main combustor 14 by acting as a pilot light for fuel ignition within main combustor 14. Torch igniter 10 can also restart combustion in combustion chamber 28 after a blow-out of torch igniter 10 has occurred by impinging additional fuel onto surface igniter 32. Further, torch igniter 10 can operate continuously with a self-sustaining flame. The self-sustaining flame can be maintained without requiring operation of surface igniters 32 by adding additional fuel to torch combustion chamber 28. Combustion gases already present in torch combustion chamber 28 ignite added fuel to create the self-sustaining flame.

While torch igniter 10 is continuously operating and its flame is self-sustaining, the resistive heating of surface igniter 32 can be stopped. In examples where surface igniter 32 is connected to a controller, as will be described in more detail in FIG. 3, the controller can use one or more inactive (i.e. not resistively heating) surface igniters 32 to probe the temperature of combustion gases within combustion chamber 28. As internal end 46 of surface igniter 32 extends into combustion chamber 28, it is exposed to the heat of combustion. A controller can measure the electrical resistance of surface igniter 32 to determine the temperature of surface igniter 32, and thereby infer the temperature of combustion gases inside of combustion chamber 28. The temperature information can be used to determine, for example, whether a blow-out of torch igniter 10 has occurred.

In some examples, fuel injector 34 can be configured to inject fuel at relatively low flow rates to reduce fuel consumption of torch igniter 10. For example, fuel injector 34 can supply approximately 1 lb. of fuel per hour during pre-takeoff startup and 10 lbs. of fuel per hour during takeoff or continuous operation. Low fuel rate configurations of fuel injector 34 are particularly advantageous for embodiments where torch igniter 10 functions only as an ignition source for main fuel injector 50.

Figure 2:
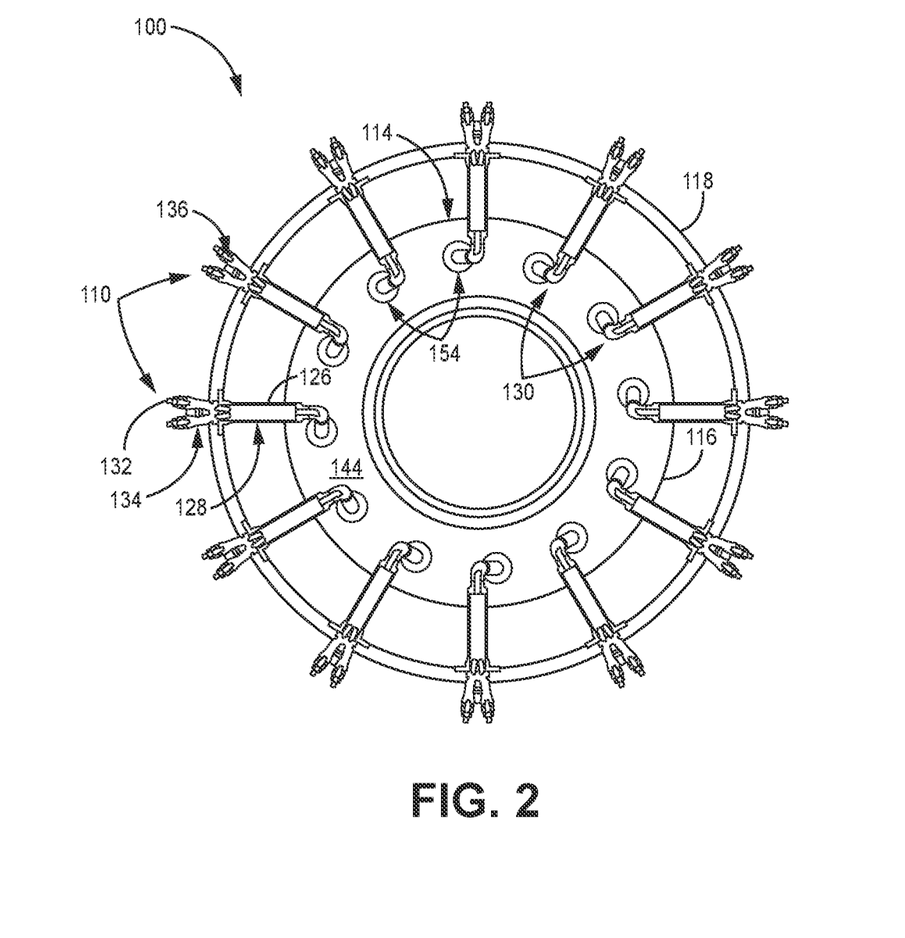
FIG. 2 is a cross-sectional view an example of a combustor system for a gas turbine engine having multiple torch injectors.

FIG. 2 is a cross-sectional view of an example of combustor system 100 for a gas turbine engine, looking generally downstream from a compressor side of combustor system 100. Combustor system 100 includes multiple torch injectors 110 mounted to main combustor 114, which is surrounded by combustor liner 116 and located in combustor case 118. Each torch injector 110 is configured similarly to as torch igniter 10 except torch injector 110 is configured to deliver the same flow rates of fuel as main fuel injector 50. Specifically, torch housing 126, torch combustion chamber 128, and outlet housing 130 are sized to handle high flow rate operation and fuel injector 134 is configured to deliver substantially the same flow rates of fuel as main fuel injector 50. The high flow rates of torch injector 110 allow for fuel injected by torch injector 110 to power the gas turbine engine, requiring fewer main fuel injectors 50 in the gas turbine engine. In some examples, such as the example depicted in FIG. 2, torch injectors 110 can replace all main fuel injectors 50 connected to main combustor 114. Notably, at these high flow rates, the rate of fuel injection by fuel injector 134 is higher than the rate of fuel consumption by combustion within torch combustion chamber 128. In these examples, the fuel injected by fuel injector 134 is not fully combusted within torch combustion chamber 128 of a torch injector 110. Rather, a portion of the fuel flows from the torch injector 110 into main combustor 114 before it is combusted. This two-stage combustion process allows torch injector 110 to be sized similarly to main fuel injector 50, reducing the weight required for torch injector 110. Notably, each torch injector is able to self-ignite by impinging fuel from fuel injector 134 onto a surface igniter 132, as described previously with respect to torch igniter 10, injector 34, and surface igniter 32. Torch injectors 110 thereby combine the advantages of torch igniters, such as torch igniter 10, and main fuel injectors, such as main fuel injector 50, thereby obviating the need for separate igniting hardware.

As shown in FIG. 2, torch injectors 110 are arranged circumferentially about dome 144 of main combustor 114. Dome 114 defines the upstream end of main combustor 114. As described with respect to cap 36 of torch igniter 10, caps 136 of torch injectors 110 extend outside of combustor case 118. Housing 126 and outlet housing 130 are located inside combustor case 118 and are arranged relative to one another as described previously with respect to housing 26 and outlet housing 30. This configuration offers the advantages described previously with respect to torch igniter 10. Further, each outlet housing 130 is surrounded by an air swirler 154 where it is connected to torch igniter 10. Air swirler 154 performs the same function as air swirler 54, as described previously, except air swirler 154 is configured to swirl the flow of fuel and combustion gases exiting outlet housing 30 into main combustor 114.

Advantageously, the use of torch injectors 110 rather than a mixture of torch igniters 10 and main fuel injectors 50 considerably simplifies the construction of combustor system 100. Further, combustor system 100 offers a number of additional advantages. Combustor system 100 has improved redundancy over other systems using separate torch igniters and main fuel injectors, as each torch injector 110 can self-ignite using a fuel injector 134 and surface igniter 132. Further, combustor system 100 does not rely on a single ignition source to light multiple fuel injectors and therefore is unlikely to suffer from asymmetric or incomplete light-around. As used herein, "light-around" refers to the process by which neighboring, unlit main fuel injectors are able to light from the flame of a neighboring, lit main fuel injector. This also gives combustor system 100 an increased operational power range over conventional combustor systems, as each torch injector 110 can be lit and operated individually. Further, this gives combustor system 100 improved stability operating at low power levels as compared to conventional combustor systems, as each torch injector 110 can inject fuel from fuel injector 134 onto surface igniter 132, ensuring that all operational torch injectors 110 remain lit.

Individual torch injectors 110 of combustor system 100 are unlikely to experience a flameout at altitude as compared to conventional combustor designs, as at least a portion of the fuel from fuel injectors 134 impinges on surface igniters 132 at all times during operation, ensuring that fuel is combusted within combustion chambers 128. Combustor system 100 also has improved altitude re-lights, as each torch injector 110 is able to restart combustion within combustion chamber 128. Further, even where individual torch injectors 110 are not able to successfully re-light at altitude using fuel injectors 134 and surface igniters 132 due to, for example, low-pressure conditions that inhibit combustion, the increased redundancy improves the likelihood that at least a portion of torch injectors 110 will be able to re-light at altitude. The portion of torch injectors 110 that are not able to successfully re-light using surface igniters 132 can then be re-lit via light-around within main combustor 114.

Use of torch injectors 110 also allows for a wider range of injection patterns into main combustor 114. While conventional fuel injectors, such as main fuel injector 50, must have an injection pattern that impinges at least partially on an ignition source, ignition occurs within torch injectors 110, allowing a much wider range of injection patterns. As such, the injection patterns of torch injectors 110 can be optimized for increased combustion efficiency and performance. Further, torch injectors 110 can be placed in a wider variety of locations within combustor case 118 as they do not have to inject fuel to impinge on an ignition source within main combustor 114.

Figure 3:
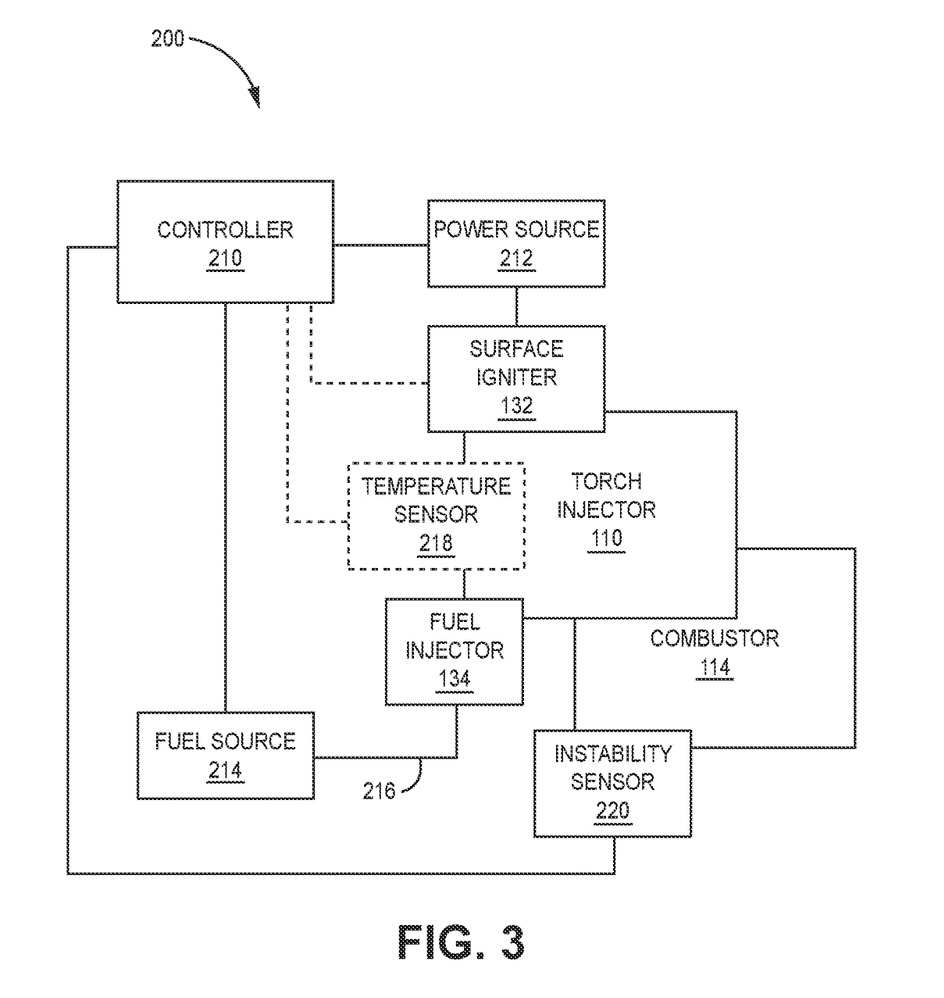
FIG. 3 is a block diagram an example of a control system that can be used with the combustor system of FIG. 2.

FIG. 3 is a block diagram of control system 200, which can be used to control torch injectors 110 in combustion system 100. Control system 200 includes controller 210, which is capable of controlling power delivery to surface igniter 132 from power source 212 and fuel delivery to fuel injector 134 from fuel source 214, as well as torch injector 110 and combustor 114. Fuel flows from fuel source 214 to fuel injector 134 along fluid path 216. Control system 200 is shown as including a single torch injector 110 for clarity, but it should be understood that controller 210 can be used to control multiple torch injectors 110 through additional connections. Alternatively, controller 210 can be configured with additional controllers 210 to control additional torch injectors 110.

Controller 210 is an electronic controller, such as an engine control unit (ECU) of a full authority digital engine control (FADEC) or another appropriate gas turbine controller, such as a power generation engine control system. Controller 210 can control the rate of fuel delivery from fuel source 214 by, for example, operating a valve disposed along fluid path 216 or a pump capable of pumping fuel from fuel source 214. Controller 210 can control the rate of fuel delivery to each fuel injector 134 individually to allow for differential output from torch injectors 110. Alternatively, controller 210 can operate a valve or pump upstream of a fuel manifold that delivers fuel at equal rates to all fuel injectors 134 in combustor system 100. Control of fuel delivery allows for controller 210 to cause torch injector 110 to, for example, operate at low power levels, as described previously.

Controller 210 can be further configured to control the rate of delivery of electrical power from power source 212. This allows controller 210 to control the amount of resistive heating provided to surface igniter 132. Controller 210 can be additionally connected to a sensor that detects the level of fuel remaining in fuel source 214 or the rate of fuel delivered from fuel source 216 along fluid path 216. As fuel levels or the rate of fuel delivery decreases, the heat of surface igniters 132 may need to be increased to allow for continued ignition of fuel. When controller 210 detects either that the amount of fuel in fuel source 214 or that the rate of fuel delivery has fallen below a pre-determined threshold, controller 210 can increase the rate of delivery of electrical power to surface igniter 132 to improve ignition of fuel injected by fuel injector 134.

Control system 200 allows for improved monitoring of various operational parameters of torch injectors 110 and combustor 114 as compared to other combustor designs. The monitored operational parameters can include, but are not limited to, temperatures and thermoacoustic instabilities. As described previously, control system 200 can also monitor various other operational parameters of other elements of control system 200, such as fuel flow, fuel levels, and electrical power delivery, and can adjust fuel flow or electrical power delivery based on any combination of the monitored operational parameter information.

Combustion temperatures can be monitored within each torch injector 110 using surface igniters 132, as previously described. Control system 200 can also optionally include temperature sensor 218, which is also capable of monitoring the temperature of combustion chamber 128 of torch injector 110. Temperature sensor 218 can be any suitable temperature sensor, such as a thermocouple.

Temperature information inferred from the resistivity of surface igniter 132 can be used by controller 210 for several advantageous purposes. Most notably, the temperature of surface igniter 132 can indicate that a flame is present in torch injector 110. As such, controller 210 can be connected to a user interface to confirm to a user of control system 200 that torch injector 110 operates continuously for the duration of the operating time of the gas turbine engine. Further, controller 210 can use the temperature information to determine if a sudden blow out of torch injector 110 has occurred. For example, a sudden drop in temperature within torch injector 110 may indicate a blow out of the self-sustaining flame in torch injector 110. Controller 210 can be configured to recognize a blow-out event and to resistively heat surface igniter 132 to restart combustion as a response.

Controller 210 can also use the temperature information to determine the maximum current that can be supplied by power source 212 to resistively heat surface igniter 132. Generally, the amount of current supplied to surface igniter 132 by power source 212 is limited to prevent thermal damage to surface igniter 132 from excessive resistive heating of surface igniter 132. However, if surface igniter 132 is at a sufficiently low temperature, additional current can be supplied by power source 212 without damaging surface igniter 132. Controller 210 can be configured to detect that the temperature of surface igniter 132 is below a pre-determined threshold and to subsequently supply additional current so that surface igniter 132 can be more rapidly resistively heated.

Further, surface igniter 132 may degrade over time. Controller 210 can also be configured to measure the resistivity of surface igniter 132 over a longer period of time, such as multiple operations of the gas turbine engine, and to store the resistivity information in a computer readable memory. Controller 210 can then compare the stored resistivity information to determine if the resistive material used to form surface igniter 132 has degraded. For example, after the changed resistance of surface igniter 132 has matched or exceeded a pre-determined threshold, controller 210 can communicate to a user that surface igniter 132 requires replacement or repair via, for example, a user interface device or display.

Controller 210 can also be configured to detect thermoacoustic instabilities within combustor 114 using instability sensor 220. Instability sensor 220 is generally configured to monitor noise and pressure oscillations within combustor 114 that indicate there is a thermoacoustic instability. Thermoacoustic instabilities caused by acoustical properties of combustor 114 and fluctuations in the flame produced within combustor 114 can damage combustor 114, torch injector 110, and other portions of the gas turbine engine. Thermoacoustic instabilities can also, for example, cause discomfort to passengers of a passenger aircraft using a gas turbine containing combustor system 100 and control system 200. When instability sensor 220 measures noise above a certain threshold or pressure oscillations above a certain frequency, controller 210 can recognize that there is a thermoacoustic instability and can adjust fuel flow to fuel injectors 134 of combustor system 100 to suppress the thermoacoustic instability. Controller 210 can uniformly adjust the rate of fuel flow to each torch injector 110 or can differentially adjust the rate of fuel flow to each torch injector 110, such that the rate of fuel flow is different to at least some torch injectors 110.

Figure 4:
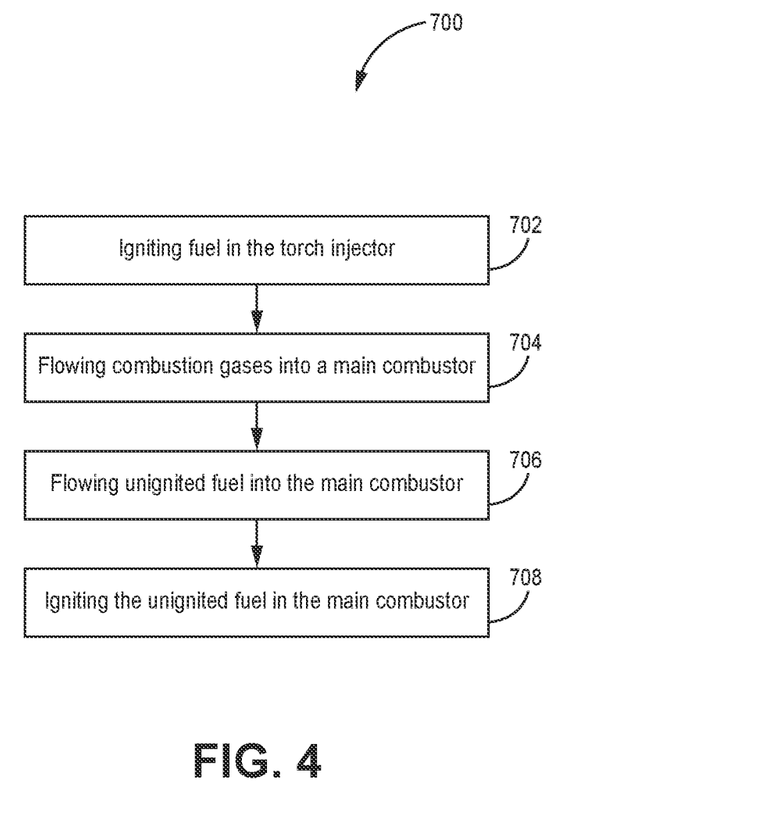
FIG. 4 is a flow diagram an example of a method of being performed by the combustor system of FIG. 2.

FIG. 4 is a flow diagram of method 700 of operating a torch injector fluidly connected to a main combustor. Method 700 can be performed by control system 200 to operate torch injectors 110 of combustor system 100. Method 700 includes steps of igniting fuel in the torch injector (702), flowing combustion gases into a main combustor (704), flowing unignited fuel into the main combustor (706), and igniting the unignited fuel in the main combustor (708).

In step 702, fuel is ignited within the torch injector. The fuel is injected into a torch combustion chamber and a portion of the fuel is impinged onto an ignition source to ignite combustion, such as a surface igniter 132. Igniting fuel within the torch combustion chamber creates hot combustion gases that can be used to ignite additional fuel that was not impinged onto the ignition source. The combustion gases may ignite an additional portion of the fuel inside the torch combustion chamber.

In step 704, the combustion gases flow into a main combustor. Generally, the torch injector is directly fluidly connected to an interior of the main combustor, allowing combustion gases to flow from the torch combustion chamber to an interior of the main combustor.

In step 706, unignited fuel flows into the main combustor. The unignited fuel is a portion of the fuel that did not impinge on an ignition source in step 702 and was not combusted inside the torch combustion chamber. The unignited fuel is injected by the same fuel injector that flowed fuel in step 702, allowing steps 702, 704, and 706 to be performed substantially simultaneously. Step 706 is generally performed by injecting fuel at a substantially higher rate than the rate of fuel consumption by combustion within the torch combustion chamber.

In step 708, the unignited fuel is ignited within the main combustor. The unignited fuel is ignited using the combustion gases generated in step 702 and flown into the main combustor in step 704. This allows for an overall two-stage combustion process wherein a portion of the fuel from the fuel injector is combusted within the torch combustion chamber and the remainder of the fuel is combusted in the main combustor of a gas turbine engine. Advantageously, this two-stage combustion process allows for the torch combustion chamber to have a relatively small size as compared to the main combustor. Consequently, the two-stage combustion process described herein allows for torch injectors performing method 700 to be sized similarly to conventional fuel injectors.

The fuel injector can be configured to flow fuel at a sufficiently high flow rate to allow unignited fuel to flow into the main combustor during all steps of method 700. Alternatively, the fuel injector can inject fuel at a lower rate in step 702 to initiate combustion within the torch combustion chamber, and then the fuel injector can inject fuel at a higher flow rate that allows unignited fuel to flow into the main combustor during steps 706 and 708.

In at least some examples, torch injectors 110 are formed monolithically. More generally, all components of torch injectors 110 can be formed partially or entirely by additive manufacturing. For example, housing 126, outlet housing 130, and cap section 136 can be formed monolithically. Torch injectors 110 can be formed entirely or partially of metal materials, such as Inconel, high-temperature steel or another nickel alloy. Alternatively, torch injectors 110 can be formed entirely or partially of a ceramic material, such as a ceramic matrix composite. Support-free additive manufacturing techniques, such as binder jetting, can also be used to form components of any torch injector disclosed herein. Additive manufacturing is particularly useful in obtaining unique geometries (e.g., outlet housing 130 or cap section 136) and for reducing the need for welds or other attachments (e.g., between cap section 136, housing 126, and outlet housing 130). However, other suitable manufacturing process can be used. For example, housing 126, outlet housing 130, and cap section 136 can be fabricated separately and joined via later manufacturing steps, such as brazing, welding or compression fitting. Similarly, any component of torch injectors 110 can be formed from different materials and joined via later manufacturing steps. For example, portions of cap section 136 can be formed from both ceramic and metal materials. Those portions could be joined to form cap 136 via a later manufacturing step.

However, surface igniters 132 are generally not formed by additive manufacturing, but rather are formed and attached to torch injector 110 via separate steps. For example, surface igniters 132 can fabricated separately and attached to torch injector 110 during additive manufacturing of torch injector 110 or during a later manufacturing step. Similarly, surface igniters 132 can be electrically connected to power source 212 and/or controller 210 via a separate manufacturing step. Where torch injector 110 includes temperature sensor 218, temperature sensor 218 and its electrical connections to controller 210 can be formed separately as described with respect to surface igniters 132.

The embodiments disclosed herein advantageously allow for the construction of torch injector systems capable of replacing conventional fuel injectors in gas turbine engines. Specifically, the torch injector systems disclosed herein are capable of self-igniting, improving redundancy, decreasing the likelihood of altitude flameouts, and improving altitude re-light performance. Further, the torch injector systems disclosed herein offer improved light-around, a greater operational power range, and improved thermoacoustic instability suppression. The torch injector systems disclosed herein also offer improved temperature monitoring over conventional combustors and fuel injectors.

Discussion of Possible Embodiments

The following are non-exclusive descriptions of possible embodiments of the present invention.

An embodiment of a combustor system for a gas turbine engine includes a combustor case, a combustor liner disposed within the combustor case and defining a main combustion chamber, a dome defining an upstream end of the main combustion chamber, and at least one torch injector attached to the dome of the main combustion chamber configured to inject combustion gases into the main combustion chamber. Each torch injector includes a torch injector housing defining and surrounding a torch combustion chamber configured to house a combustion reaction, an outlet passage defined by the torch injector housing, an electrothermal ignition source extending at least partially into the torch combustion chamber, and a fuel injector configured to inject fuel into the torch combustion chamber to at least partially impinge on the electrothermal ignition source and generate the combustion gases. The outlet passage directly fluidly connects the torch combustion chamber to the main combustion chamber.

The combustor system of the preceding paragraph can optionally include, additionally and/or alternatively, any one or more of the following features, configurations and/or additional components:

A combustor system for a gas turbine engine according to an exemplary embodiment of this disclosure, among other possible things includes a combustor case, a combustor liner disposed within the combustor case and defining a main combustion chamber, a dome defining an upstream end of the main combustion chamber, and at least one torch injector attached to the dome of the main combustion chamber configured to inject combustion gases into the main combustion chamber. Each torch injector includes a torch injector housing defining and surrounding a torch combustion chamber configured to house a combustion reaction, an outlet passage defined by the torch injector housing, an electrothermal ignition source extending at least partially into the torch combustion chamber, and a fuel injector configured to inject fuel into the torch combustion chamber to at least partially impinge on the electrothermal ignition source and generate the combustion gases. The outlet passage directly fluidly connects the torch combustion chamber to the main combustion chamber.

A further embodiment of the foregoing combustor system, wherein the at least one torch injector comprises a plurality of torch injectors.

A further embodiment of any of the foregoing combustor systems, further comprising control circuitry configured to control a rate of fuel delivered to each fuel injector from a fuel source.

A further embodiment of any of the foregoing combustor systems, wherein the control circuitry is configured to selectively deliver fuel to a portion of the plurality of torch injectors.

A further embodiment of any of the foregoing combustor systems, wherein the control circuitry is further configured to detect a thermoacoustic instability of the combustor system and is further configured to adjust the rate of fuel delivered to each fuel injector to suppress the thermoacoustic instability.

A further embodiment of any of the foregoing combustor systems, wherein the combustion chamber is oriented about an axis and the combustion chamber has upstream and downstream ends defining a flow direction through the combustion chamber along the axis.

A further embodiment of any of the foregoing combustor systems, wherein the outlet passage is bent and a direction of flow of combustion gases from the outlet passage into the main combustion chamber is not coaxial with the axis.

A further embodiment of any of the foregoing combustor systems, wherein a portion of the torch injector extends outside of the combustor case.

A further embodiment of any of the foregoing combustor systems, wherein the torch injector is configured to inject unignited fuel into the main combustion chamber.

A further embodiment of any of the foregoing combustor systems, further comprising control circuitry configured to control a rate of delivery of fuel to the fuel injector from a fuel source connected to the fuel injector and measure a temperature of the torch combustion chamber.

A further embodiment of any of the foregoing combustor systems, wherein the electrothermal ignition source is a glow plug.

A further embodiment of any of the foregoing combustor systems, wherein an innermost end of the glow plug extends into the torch combustion chamber and an outermost end of the glow plug is connected to the control circuitry.

A further embodiment of any of the foregoing combustor systems, wherein the control circuitry is further configured to measure the temperature of the combustion chamber based on electrical resistance of the first glow plug.

A further embodiment of any of the foregoing combustor systems, wherein

A further embodiment of any of the foregoing combustor systems, wherein the control circuitry is configured to control a rate of delivery of electrical power to the glow plug from a power source connected to the glow plug.

A further embodiment of any of the foregoing combustor systems, wherein the power source is configured to resistively heat the glow plug.

A further embodiment of any of the foregoing combustor systems, wherein the control circuitry is configured to increase the rate of delivery of electrical power to the glow plug when the rate of delivery of fuel from the fuel source is below a pre-determined threshold.

A further embodiment of any of the foregoing combustor systems, wherein the control circuitry is configured to control a rate of delivery of electrical power to the glow plug from a power source connected to the glow plug.

A further embodiment of any of the foregoing combustor systems, wherein the power source is configured to resistively heat the glow plug.

A further embodiment of any of the foregoing combustor systems, wherein the control circuitry is configured to increase the rate of delivery of electrical power to the glow plug when the temperature is below a pre-determined threshold.

A further embodiment of any of the foregoing combustor systems, further comprising a thermocouple disposed within the torch combustion chamber.

A further embodiment of any of the foregoing combustor systems, wherein the control circuitry is configured to measure the temperature of the combustion chamber with the thermocouple.

A further embodiment of any of the foregoing combustor systems, further comprising an air swirler surrounding the outlet passage and attached to the dome of the main combustor.

An embodiment of a method of operating a combustor system in a gas turbine engine includes flowing a first fuel from a first fuel injector to a first torch combustion chamber of a first torch injector, igniting a first portion of the first fuel by impinging the first portion on a first electrothermal ignition source within a first torch combustion chamber to create first combustion gases, flowing the first combustion gases to a main combustion chamber through a first outlet passage, flowing a second, unignited portion of the first fuel from the first fuel injector to the main combustion chamber through the first torch combustion chamber and the first outlet passage, and igniting the second, unignited portion of the first fuel with the first combustion gases in the main combustion chamber. The torch injector includes the first torch injector housing, first outlet passage, and the first electrothermal ignition source. The first torch injector housing defines the first torch combustion chamber, the first outlet passage directly fluidly connects the first torch combustion chamber to the main combustion chamber of the combustor system, and the first electrothermal ignition source is disposed at least partially in the first torch combustion chamber.

The method of the preceding paragraph can optionally include, additionally and/or alternatively, any one or more of the following features, configurations and/or additional components:

A method of operating a combustor system in a gas turbine engine according to an exemplary embodiment of this disclosure, among other possible things includes flowing a first fuel from a first fuel injector to a first torch combustion chamber of a first torch injector, igniting a first portion of the first fuel by impinging the first portion on a first electrothermal ignition source within a first torch combustion chamber to create first combustion gases, flowing the first combustion gases to a main combustion chamber through a first outlet passage, flowing a second, unignited portion of the first fuel from the first fuel injector to the main combustion chamber through the first torch combustion chamber and the first outlet passage, and igniting the second, unignited portion of the first fuel with the first combustion gases in the main combustion chamber. The torch injector includes the first torch injector housing, first outlet passage, and the first electrothermal ignition source. The first torch injector housing defines the first torch combustion chamber, the first outlet passage directly fluidly connects the first torch combustion chamber to the main combustion chamber of the combustor system, and the first electrothermal ignition source is disposed at least partially in the first torch combustion chamber.

A further embodiment of the foregoing method, further comprising flowing a second fuel from a second fuel injector to a second torch combustion chamber of a second torch injector.

A further embodiment of any of the foregoing methods, wherein the second torch injector comprises a second torch injector housing defining the second torch combustion chamber, a second outlet passage that directly fluidly connects the second torch combustion chamber to the main combustion chamber of the combustor system, and a second electrothermal ignition source disposed at least partially in the second torch combustion chamber.

A further embodiment of any of the foregoing methods, further comprising igniting a third portion of the second fuel by impinging the third portion on the second electrothermal ignition source to create second combustion gases.

A further embodiment of any of the foregoing methods, further comprising flowing the second combustion gases to the main combustion chamber through the second outlet passage.

A further embodiment of any of the foregoing methods, further comprising flowing a fourth, unignited portion of the second fuel from the second fuel injector to the main combustion chamber through the second torch combustion chamber and the outlet passage.

A further embodiment of any of the foregoing methods, further comprising igniting the fourth, unignited portion of the second fuel with at least one of the first and second combustion gases in the main combustion chamber.

A further embodiment of any of the foregoing methods, further comprising determining an operational parameter of the first torch injector, the second torch injector, or the first and second torch injectors.

A further embodiment of any of the foregoing methods, further comprising selectively flowing the first fuel and the second fuel based on the operational parameter.

A further embodiment of any of the foregoing methods, further comprising detecting a thermoacoustic instability of the main combustion chamber.

A further embodiment of any of the foregoing methods, further comprising selectively flowing the first fuel and the second fuel to suppress the thermoacoustic instability.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A combustor system for a gas turbine engine, the combustor system comprising:
   a combustor case;
   a combustor liner disposed within the combustor case and defining a main combustion chamber;
   a dome defining an upstream end of the main combustion chamber; and
   at least one torch injector attached to the dome of the main combustion chamber configured to inject combustion gases into the main combustion chamber, each torch injector comprising:
   a torch injector housing defining and surrounding a torch combustion chamber configured to house a combustion reaction;
   an outlet passage defined by the torch injector housing, wherein the outlet passage directly fluidly connects the torch combustion chamber to the main combustion chamber;
   an electrothermal ignition source extending at least partially into the torch combustion chamber; and
   a fuel injector configured to inject fuel into the torch combustion chamber to at least partially impinge on the electrothermal ignition source and generate the combustion gases,
   wherein the torch injector is configured to inject unignited fuel into the main combustion chamber through the torch combustion chamber and the outlet passage.

2. The combustor system of claim 1, wherein the at least one torch injector comprises a plurality of torch injectors.

3. The combustor system of claim 2, further comprising control circuitry configured to control a rate of fuel delivered to each fuel injector from a fuel source.

4. The combustor system of claim 3, wherein the control circuitry is configured to selectively deliver fuel to a portion of the plurality of torch injectors.

5. The combustor system of claim 3, wherein the control circuitry is further configured to detect a thermoacoustic instability of the combustor system and is further configured to adjust the rate of fuel delivered to each fuel injector to suppress the thermoacoustic instability.

6. The combustor system of claim 1, wherein the combustion chamber is oriented about an axis and the combustion chamber has upstream and downstream ends defining a flow direction through the combustion chamber along the axis.

7. The combustor system of claim 6, wherein the outlet passage is bent and a direction of flow of combustion gases from the outlet passage into the main combustion chamber is not coaxial with the axis.

8. The combustor system of claim 1, wherein a portion of the torch injector extends outside of the combustor case.

9. The combustor system of claim 1, further comprising control circuitry configured to:
   control a rate of delivery of fuel to the fuel injector from a fuel source connected to the fuel injector; and
   measure a temperature of the torch combustion chamber.

10. The combustor system of claim 9, wherein the electrothermal ignition source is a glow plug.

11. The combustor system of claim 10, wherein an innermost end of the glow plug extends into the torch combustion chamber and an outermost end of the glow plug is connected to the control circuitry, and the control circuitry is further configured to measure the temperature of the combustion chamber based on electrical resistance of the first glow plug.

12. The combustor system of claim 10, wherein:
    the control circuitry is configured to control a rate of delivery of electrical power to the glow plug from a power source connected to the glow plug;
    the power source is configured to resistively heat the glow plug; and
    the control circuitry is configured to increase the rate of delivery of electrical power to the glow plug when the rate of delivery of fuel from the fuel source is below a pre-determined threshold.

13. The combustor system of claim 10, wherein:
    the control circuitry is configured to control a rate of delivery of electrical power to the glow plug from a power source connected to the glow plug;
    the power source is configured to resistively heat the glow plug; and
    the control circuitry is configured to increase the rate of delivery of electrical power to the glow plug when the temperature is below a pre-determined threshold.

14. The combustor system of claim 9, further comprising a thermocouple disposed within the torch combustion chamber, wherein the control circuitry is configured to measure the temperature of the combustion chamber with the thermocouple.

15. The combustor system of claim 1, further comprising an air swirler surrounding the outlet passage and attached to the dome of the main combustor.

16. A method of operating a combustor system in a gas turbine engine, the method comprising:
  flowing a first fuel from a first fuel injector to a first torch combustion chamber of a first torch injector, the first torch injector comprising:
    a first torch injector housing defining the first torch combustion chamber;
    a first outlet passage that directly fluidly connects the first torch combustion chamber to a main combustion chamber of the combustor system; and
    a first electrothermal ignition source disposed at least partially in the first torch combustion chamber;
  igniting a first portion of the first fuel by impinging the first portion on the first electrothermal ignition source to create first combustion gases;
  flowing the first combustion gases to the main combustion chamber through the first outlet passage;
  flowing a second, unignited portion of the first fuel from the first fuel injector to the main combustion chamber through the first torch combustion chamber and the first outlet passage; and
  igniting the second, unignited portion of the first fuel with the first combustion gases in the main combustion chamber.

17. The method of claim 16, further comprising:
  flowing a second fuel from a second fuel injector to a second torch combustion chamber of a second torch injector, the second torch injector comprising;
    a second torch injector housing defining the second torch combustion chamber;
    a second outlet passage that directly fluidly connects the second torch combustion chamber to the main combustion chamber of the combustor system; and
    a second electrothermal ignition source disposed at least partially in the second torch combustion chamber;
  igniting a third portion of the second fuel by impinging the third portion on the second electrothermal ignition source to create second combustion gases;
  flowing the second combustion gases to the main combustion chamber through the second outlet passage;
  flowing a fourth, unignited portion of the second fuel from the second fuel injector to the main combustion chamber through the second torch combustion chamber and the outlet passage; and
  igniting the fourth, unignited portion of the second fuel with at least one of the first and second combustion gases in the main combustion chamber.

18. The method of claim 17, further comprising:
  determining an operational parameter of the first torch injector, the second torch injector, or the first and second torch injectors; and
  selectively flowing the first fuel and the second fuel based on the operational parameter.

19. The method of claim 17, further comprising:
  detecting a thermoacoustic instability of the main combustion chamber; and
  selectively flowing the first fuel and the second fuel to suppress the thermoacoustic instability.

* * * * *